United States Patent [19]

Solomon

[11] 4,053,037

[45] Oct. 11, 1977

[54] REVERSING RATCHET

[75] Inventor: Donald F. Solomon, Newport Beach, Calif.

[73] Assignee: Jo-Line Tools, Inc., Anaheim, Calif.

[21] Appl. No.: 694,775

[22] Filed: June 10, 1976

[51] Int. Cl.$^2$ .............................................. F16D 41/16
[52] U.S. Cl. ........................................ 192/43.1; 81/63
[58] Field of Search .................... 192/43.1; 81/63, 63.2

[56] References Cited

U.S. PATENT DOCUMENTS

| 2,188,846 | 1/1940 | Rueb ........................................ 81/63 X |
| 2,981,389 | 4/1961 | Kilness ................................. 192/43.1 X |
| 3,044,591 | 7/1962 | Kilness ..................................... 192/43.1 |
| 3,369,416 | 2/1968 | Kilness ................................. 192/43.1 X |
| 3,677,102 | 7/1972 | Simonetta ............................... 81/63 X |

Primary Examiner—Allan D. Herrmann
Attorney, Agent, or Firm—Fulwider, Patton, Rieber, Lee & Utecht

[57] ABSTRACT

A ratchet is provided in which directional indexing is achieved by rotation of an indexing member in the rotational direction in which it is desired to rotate a workpiece. Locking in an indexing position is achieved by means of detent mechanisms situated in a channel extending through a guide element and biased radially outward therefrom to interact with said indexing member. A pawl is provided within a cavity defined between a guide element extending from a torque transmitting member and an encircling annular ring at the end of the work handle. One surface of the pawl is of arcuate configuration equipped with ratchet teeth engageable with corresponding ratchet teeth on the interior surface of the annular ring of the work handle. An opposing surface of the pawl is of overall convex configuration so that the pawl may be rolled across a planar bearing surface of the guide element under the influence of the directional indexing member. In this manner engagement of a workpiece may be effected by the torque transmitting member as desired in either of two opposing directions of rotation.

7 Claims, 5 Drawing Figures

U.S. Patent     Oct. 11, 1977     4,053,037
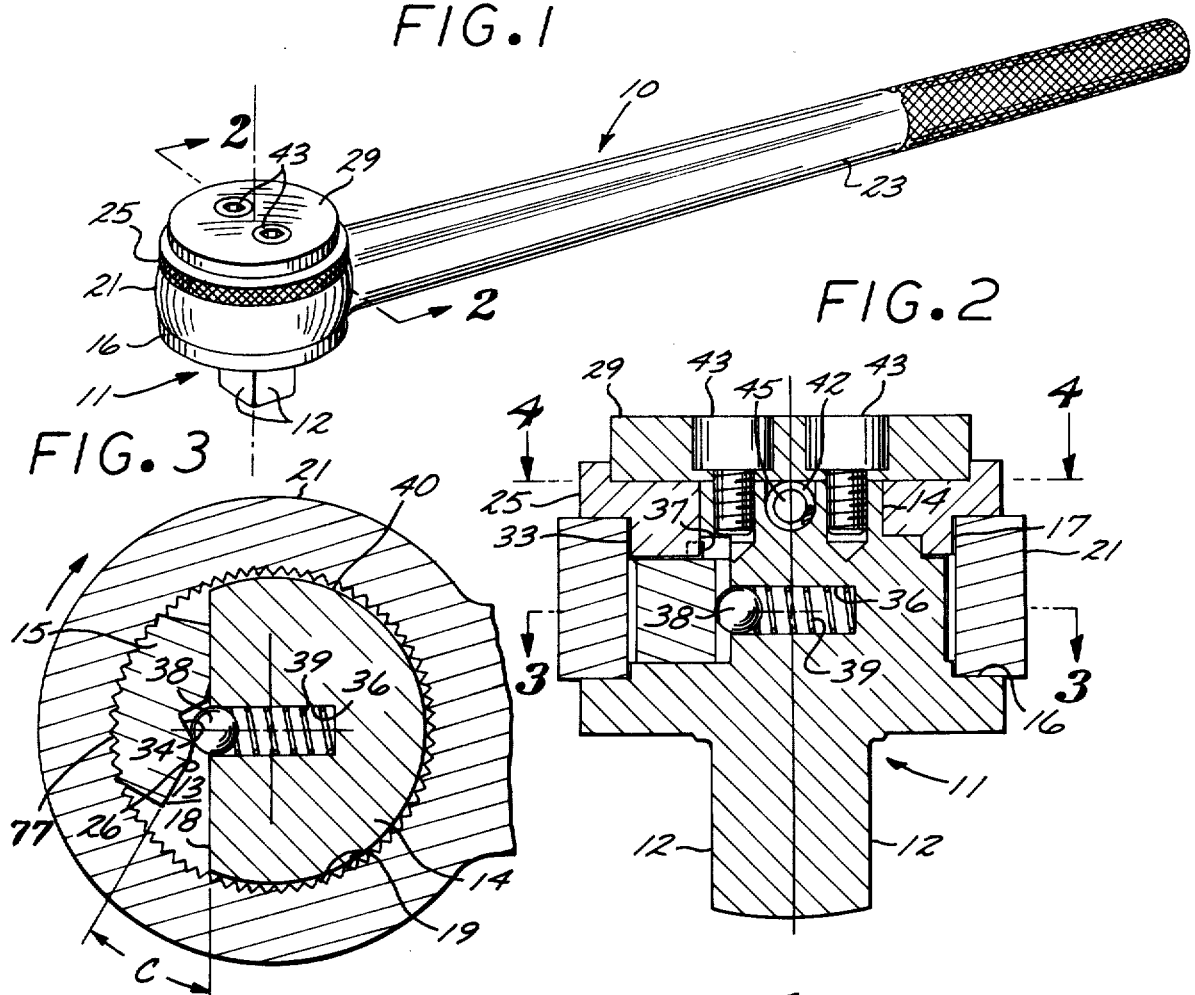
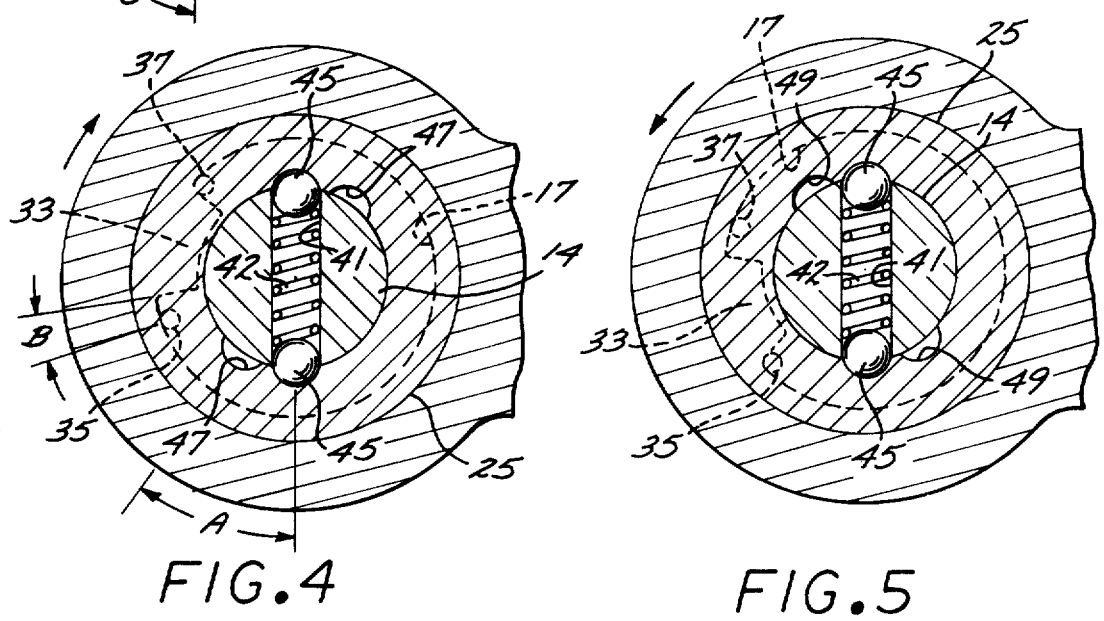

REVERSING RATCHET

This invention relates to a ratcheting tool, such as a tool designed for hand held operation for use with socket wrenches and the like.

BACKGROUND OF THE INVENTION

Ratcheting tools have been used extensively as hand tools for use with socket wrenches and other mechanical adapters for engaging various types of workpieces. The principle of a hand held ratchet tool is that rotational force exerted on a lever arm in the form of a work handle exerts torque on a workpiece, which torsional force acts about the same axis as the axis of rotation of the work handle. Ratchet tools are designed for reversible engagement. That is, rotation of the work handle in one direction will cause engagement of mating ratchet teeth within the ratchet tool to transmit torque to a workpiece. Counter-rotation of the work handle will disengage the ratchet teeth so that the work handle merely backs up for subsequent forward rotation in the direction in which it is desired to turn the workpiece. Various indexing member have been designed to effect reversal of the direction of engagement so that the ratchet tool can be used to turn the workpiece in either of two opposing directions of rotation by operation of a reversing mechanism. Typical ratchet tools employing such conventional indexing members are described in U.S. Pat. Nos. 3,783,703; 3,677,102; and 3,127,799.

SUMMARY OF THE INVENTION

A principal object of the invention is to provide a ratcheting tool in which the directional reversing indexing member is turned in the same direction in which it is desired to engage a workpiece. This allows the operator to maintain a certain amount of torque on the workpiece, and at the same time to alter the position of the directional reversing indexing mechanism, all using but one hand. This facilitates use of the ratcheting tool, particularly in hard to reach places. In other ratcheting tools, where adjustment to the direction changing mechanism requires movement of the indexing member in a direction opposite to that in which the workpiece is to be rotated, there is a significant likihood that the ratcheting tool will become disengaged from the workpiece in attempting to make the adjustment. This results in considerable inconvenience in that the ratcheting tool is likely to fall if it is being manipulated with one hand. In many cases further inconvenience results in that the workpiece also falls. There is thus a considerable delay in retrieving both the workpiece and the ratcheting tool so that one may proceed with the desired operation.

Another object of the invention is to reduce the likihood that the rotational engagement adjusting mechanism will be inadvertently operated during use of the ratchet tool. When applying force to engage the workpiece, not infrequently force is applied directly to the rotational adjustment mechanism, particularly if the tool is being manipulated in cramped quarters with one hand. Using a ratcheting tool of the present design, however, even if such force is applied the direction of workpiece engagement is not reversed, as in conventional tools. Rather, any force which is applied to the indexing member merely adds to the force applied to the work handle.

A further object of a preferred form of the invention is the provision of rotational engagement adjustment locking means in the form of opposing detent mechanisms. These opposing detent mechanisms are positioned radially opposite each other with respect to the axis of rotation of the torque transmitting member of the ratcheting tool which acts upon the workpiece. The benefit of this construction is that the radial components of forces which act between the work handle and the torque transmitting member through the detent means nullify each other. There is therefore no resultant radial force tending to deflect the alignment of the ratcheting tool from the axis about which the workpiece is to be turned. The absence of such a resultant deflecting force materially reduces the internal stress and wear on the component parts of the ratcheting tool, and substantially increase the tool life.

A further object of the preferred embodiment of the invention is the provision of a biasing means within the ratcheting tool to hold a pawl in position during rotation of the work handle. The pawl has ratchet teeth which engage with mating teeth fixed with respect to the work handle when the handle is turned in the direction in which it is desired to turn the workpiece. This biasing prevents the pawl from inadvertently slipping or reversing or jamming in the ratcheting tool. Thus, it is not only the torsional force on the work handle which holds the pawl in engagement, but in addition there is provided a biasing means to effect an affirmative latching action.

BRIEF DESCRIPTION OF THE INVENTION

FIG. 1 is a perspective view of the ratcheting tool of this invention.

FIG. 2 is a sectional view taken along the lines 2—2 of FIG. 1.

FIG. 3 is a sectional view taken along the lines 3—3 of FIG. 2.

FIG. 4 is a sectional view taken along the lines 4—4 of FIG. 2 illustrating the directional indexing member adjusted for engagement in the clockwise direction.

FIG. 5 is a sectional view taken along the lines 4—4 of FIG. 2 illustrating the directional indexing member adjusted for engagement in the counterclockwise direction.

DETAILED DESCRIPTION OF THE INVENTION

Refering now to FIG. 1 there illustrated a ratcheting tool 10 which includes a work handle 23 terminating in an annular ring 21. A torque transmitting member 11 is rotatable about its own axis and has parallel surfaces 12 for engaging a workpiece, such as a wrench socket. The parallel surfaces 12 are arranged in an axially extending configuration of prismatic cross section. The torque transmitting member 11 of the embodiment illustrated terminates in an engaging lug of square configuration as depicted in the drawings.

The torque transmitting member 11 also includes a coazial guide element 14. The shape of this guide element 14 is that of a portion of a cylinder which is longitudinally disected by an axially extending planar bearing wall 18. A channel 41 extends transversely through the guide element 14.

The annular ring 21, which is connected to the work handle 23, is positioned adjacent to the bearing ledge 16 of the torque transmitting member 11. The annular ring 21 has an interior surface which is equipped with radial interiorally directed ratchet teeth 19. As best illustrated in FIG. 3, the annular ring 21 and the guide element 14 are positioned in mutual coaxial arrangement to define a cavity 13 between the interior surface of the ring 21 and the bearing wall 18 of the guide element 14.

A pawl 15 is located within the cavity 13 and has an arcuate surface equipped with ratchet teeth 77 for positioning in engagement with the ratchet teeth 19 of the annular ring 21. The pawl 15 has an opposing bearing surface 26 of the overall convex configuration. A depression 34 is defined in the center of the convex bearing surface 26.

The pawl 15 also has axially extending engagement pins 35 and 37. A directional indexing member 25 has an annular collar 17 partially riding on the annular ring 21 and partially depending interiorally therefrom and extending between the guide element 14 and the annular ring 21. The directional indexing member 25 has defined therein two opposing sets of radially extending detent depressions 47 and 49. These detent depressions are adjacent to and coplanar with the transverse channel 41 of the guide element 14.

The directional indexing member 25 also includes a downwardly projecting pie shaped boss 33 extending in an axial direction toward the pawl 15. The boss is received between the pins 35 and 37 extending upwardly from pawl 15. The boss 33 may be selectively laterally engaged by either of the engagement pins 35 or 37 of the pawl 15. The boss 33, acting through the selected one of these pins, is used to roll the convex surface 26 of the pawl laterally across the bearing plane 18 of the guide element 14. This selectively positions the pawl within the cavity 13 for engagement with the ring 21 for rotation in either a clockwise or counterclockwise direction of rotation.

The planar bearing surface 18 has associated therewith a constraining means. This constraining means includes a radial tunnel 36 which extends into the guide element 14. A compressed spring 39 is positioned in the tunnel, and a detent sphere 38 is located at the opening of the tunnel and is biased radially outward by the spring 39. The sphere 38 thereby acts against the convex bearing surface 26 at the depression 34 therein to aid in restricting undesired movement of the pawl 15 within the cavity 13, even in the absence of forces applied to the pawl 15 through either of the engagement pins 35 or 37. This prevents the pawl 15 from inadvertently shifting within the cavity 13, since the constraining means prevents the convex surface 26 of the pawl from rolling across the bearing surface 18 of the guide element 14 unless forced in this manner by the boss 33.

As illustrated in FIGS. 4 and 5, the boss 33 may be adjusted for lateral engagement with the pin 37 to effect engagement of the ratcheting teeth 17 and 19 when the work handle 23 is rotated in a clockwise direction as viewed from above. When the handle is rotated counterclockwise, the pawl will become disengaged and the teeth 19 will merely ratchet past the teeth 17 as the annular ring 21 is backed up.

Alternatively, the boss 33 may be adjusted to laterally engage the pin 35 to effect engagement of the ratcheting teeth when the work handle 22 is rotated in a counterclockwise direction as illustrated in FIG. 5. Clockwise rotation of the handle will then merely disengage the teeth 17 and 19. It should be noted, that the adjustment feature permits the boss 33 to be alternatively engaged with either of the pins 35 or 37, but not both simultaneously.

As illustrated, the cross sectional configuration of the boss 33 is a truncated sector of a circle coaxial with the guide element 14. As may be determined from reference to FIG. 2, the external radius of the boss 33, and indeed the entire depending portion of the annular collar 17 is such that there is internal clearance with respect to the annular ring 21.

The annular separation denoted as A between adjacent depressions in the sets of depression 47 and 49 in the indexing member 25 is equal to the sum of the maximum angular movement C of the pawl 15 within the cavity 13 and the maximum angular separation B between the boss 33 and an engagement pin 35 or 37. That is, the angle A between the sets of depressions 47 and 49 is equal to the angle C reflecting the movement of pawl 15 within cavity 13, plus the angle B which is the maximum angular separation between the boss 33 and an engagement pin, either 35 or 37.

As previously discussed, the guide element 14 has a transverse bore or channel 41 extending therethrough. A detent means is located within the channel 41. The detent means is in the form of two indexing spheres 45 positioned at opposite ends of the channel 41 and separated from each other and biased radially outward from the guide element 14 by a compressed spring 42 located in the channel 41. It can be seen that the directional indexing member 25 may be adjusted so that either the set 47 or the set 49 of the detent depressions in the indexing member 25 are selectively engaged by the spheres 45.

When it is desired to set the ratcheting tool for engagement with the workpiece when the handle 23 is rotated in a clockwise direction, the directional indexing ring 25 is first rotated clockwise. This seats the indexing spheres in the set of depressions 49, as illustrated in FIG. 4. The clockwise rotation of the indexing member 25 also causes the boss 33 to engage the engagement pin 37 and to carry the pawl 15 clockwise in the cavity 13. This engages the peripheral teeth 17 of the pawl 15 with the interior teeth 19 of the ring 21. The convex surface 26 of the pawl 15 is rolled across the planar bearing surface 18 of the guide element 14 until it arrives at the position indicated in FIG. 3. Rotation of the handle 23 in a clockwise direction thereby rotates the torque transmitting number 11 in a clockwise direction. However, when the handle 23 is returned in a counterclockwise direction, the ring 21 will carry the pawl backward slightly in a counterclockwise direction and the teeth 19 will merely ratchet pass the teeth 17 of the pawl 15. The pawl 15 is constrained in its counterclockwise movement, however, by the sphere 38 which is acted upon by the spring 39. This prevents the pawl 15 from being carried to far in a counterclockwise direction, as the spring 39 is compressed only sufficiently 14 to allow the teeth 19 to ratchet pass the teeth 17.

In a similar manner, when the ratchet tool is to be set so that the workpiece will be engaged by rotation of the handle 23 in a counterclockwise direction, the indexing member 25 is rotated counterclockwise. This depresses the spring 42 so that the indexing member 25 rides past the spheres 45 until the spheres 45 seat in the set of depressions 47, as in FIG. 5. This movement of the member 25 also carries the boss 33 counterclockwise to engage the pin 35 on pawl 15 and to carry pawl 15 in a counterclockwise direction. When adjusted in this manner the tool will engage a workpiece when the handle 23 is rotated in a counterclockwise direction. Return of the handle 23 in a clockwise direction will again merely result in the teeth 19 being ratcheted past the teeth 17 of the pawl 15. The torque transmitting member 11 is thereby rotated in a counterclockwise direction to carry a workpiece engaged therewith in the same direction.

The foregoing description and illustration of the embodiment of the invention depicted should not be construed as limiting the scope of the invention, which is defined by the claims appended hereto.

I claim:

1. A ratcheting tool for applying torque to a workpiece comprising:
   a. a torque transmitting member rotatable about its own axis and having parallel surfaces for engaging a workpiece and arranged in an axially extending configuration of prismatic cross section and further including a coaxial guide element defined in the shape of a portion of a cylinder that is longitudinally disected by an axially extending planar bearing wall and wherein a channel is defined extending transversely through said guide,
   b. a work handle terminating in an annular ring positioned adjacent to said torque transmitting member and having an interior surface equipped with radial interiorally directed ratchet teeth, wherein said annular ring and said guide element are positioned in mutual coaxial arrangement to define a cavity between the interior surface of said ring and said bearing wall,
   c. a pawl located within said cavity and having an arcuate surface equipped with ratchet teeth for positioning in engagement with said ratchet teeth of said annular ring, and having an opposing bearing surface of overall convex configuration, and having axially extending engagement pins,
   d. a direction indexing member positioned in annular disposition about said guide element and defining two opposing sets of radially extending detent depressions adjacent to and coplanar with said transverse channel of said guide element and having a boss extending toward said pawl and laterally engageable by either of said engagement pins to act through said pins to roll the convex surface of said pawl laterally across said bearing plane to selectively position said pawl within said cavity, and
   e. detent means located within said channel and biased radially outward from said guide element to selectively engage either of said sets of detent depression in said indexing member.

2. The ratcheting tool of claim 1 further characterized in that said detent means includes two spheres positioned at opposite ends of said channel and separated from each other and biased radially outward from said guide element by a compressed spring located in said channel.

3. The ratcheting tool of claim 1 further characterized in that said planar bearing surface has associated therewith a constraining means which acts upon the bearing surface of said pawl to aid in immobilizing said pawl within said cavity in the absence of force applied to said pawl through said engagement pins to roll the convex surface of said pawl across said bearing surface of said guide element.

4. The ratcheting tool of claim 3 wherein a depression is defined in the center of the convex bearing surface of said pawl, and wherein said constraining means is comprised of a radial tunnel into said guide element, a compressed spring positioned in said tunnel, and a detent sphere located at the opening of said tunnel and biased radially outward by said spring to act against said convex bearing surface of said pawl at the depression therein.

5. The ratcheting tool of claim 1 wherein the angular separation between adjacent depression in said sets of depressions in said indexing member is equal to the sum of the maximum angular movement of said pawl within said cavity and the maximum angular separation between said boss and an engagement pin.

6. The ratcheting tool of claim 1 wherein said directional indexing member includes an annular collar extending between said guide element and said annular ring of said work handle.

7. The ratcheting tool of claim 1 wherein the cross sectional configuration of said boss is a truncated sector of a circle coaxial with said guide element and having an external radius sufficient for internal clearance with respect to said annular ring of said work handle.

* * * * *